Oct. 28, 1969 R. G. REIMUS ET AL 3,474,723
BEVERAGE APPARATUS
Original Filed Dec. 2, 1965
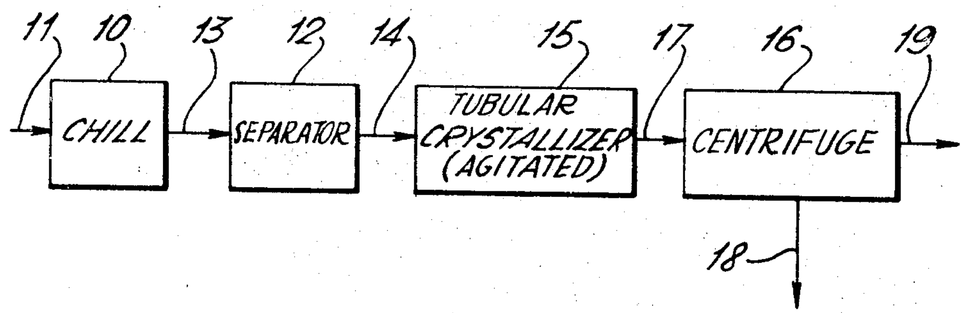

United States Patent Office 3,474,723
Patented Oct. 28, 1969

3,474,723
BEVERAGE APPARATUS

Richard G. Reimus and Anthony Saporito, Warren, Pa., assignors to Struthers Scientific and International Corporation Application Apr. 3, 1968, Ser. No. 718,510, now Patent No. 3,432,308, dated Mar. 11, 1969, which is a division of application Ser. No. 511,173, Dec. 2, 1965, now Patent No. 3,381,302, dated Apr. 30, 1968. Divided and this application Sept. 30, 1968, Ser. No. 763,851
Int. Cl. A23f *1/08;* B01d *9/04*
U.S. Cl. 99—236 5 Claims

ABSTRACT OF THE DISCLOSURE

A system of apparatus for removing water from coffee and tea extract by first chilling to form a suspension of solids in the liquid is provided which removes the solids from the liquid and thereafter forms a mixture of ice and liquid. The ice is separated in a centrifuge and is washed. Apparatus for removing the solids before forming ice prevents plugging of the centrifuge.

This application is a division of copending application Ser. No. 718,510, filed Apr. 3, 1968, now Patent No. 3,432,308 issued Mar. 11, 1969, which is a division of Ser. No. 511,173, now Patent No. 3,381,302 issued Apr. 30, 1968.

This invention relates to apparatus for the preparation of concentrated comestible liquids and liquid extracts and is particularly applicable to equipment for making soluble tea and coffee solids or "powdered coffee." More particularly, this invention relates to systems of equipment for use in the pretreatment of liquids and liquid extracts in a step preliminary to removal from the extract by a freezing process.

Soluble, or "powdered," coffee has been prepared by first extracting coffee beans with hot water and subsequently dehydrating the extract by spray drying under vacuum conditions. This process has met with vast commercial success, but the flavour of the soluble coffee leaves much to be desired. The vacuum conditions employed not only remove water from the extract, but also cause volatile taste and flavour elements of the coffee to evaporate. The resulting soluble product is, therefore, never as good as the extract from which it is prepared.

To improve the flavour of the soluble coffee, it has been often proposed to remove substantial amounts of water in the extract by partially freezing the extract and separating the resulting pure ice crystals from the concentrated extract. This process of partial freezing is then followed by a complete dehydration by evaporation of water which may be conducted under vacuum conditions. In this way, the coffee loses less of the volatile components by virtue of the fact that the extract is subject to evaporation conditions for shorter periods of time.

In a preferred embodiment of the freezing process, the coffee extract is partially frozen by indirect refrigeration in a suitable crystallizer and the resulting slurry of ice and concentrate is subjected to centrifugation to separate the ice from the concentrate. In order for the process to be economical, this separation and the subsequent water wash of the crystals on the centrifuge basket must effect a relatively complete removal of mother liquor from the ice crystals.

However, when coffee extract is cooled to near its initial freezing point, a gummy or waxy solid material often precipitates from solution prior to ice formation. This wax or tar is carried along with the ice crystals and coffee extract into the centrifuge and collects on the centrifuge basket, eventually plugging the basket and preventing the complete separation of ice from concentrated extract.

This problem of the precipitation of insoluble materials in the coffee extract is not a problem exclusive to coffee extracts alone, but is also encountered in the preparation of other concentrated extracts of comestible materials. Thus, the apparatus of this invention is also applicable to the preparation of concentrated extracts of such comestible materials as tea, grape juice, apple juice, beer and orange juice.

According to this invention an apparatus for concentration of comestible liquids comprising a precooling device, a precipitate separation device, and a freeze concentration device are connected together in that order to form a system.

The initial steps in the process of preparing instant coffee are the same as preparing regular coffee. Following roasting, the coffee is ground, but the granulation may be extremely coarse and, in some cases, fine particles that may result from grinding are sieved out and used elsewhere.

The grounds are placed in closed containers known as extractors. These extractors are set up in batteries with several extractors to a battery.

Ground coffee and hot water are charged into the first extractor. The coffee is then extracted until the necessary materials have been removed from the grounds. The resulting extract is then charged in the second extractor containing fresh coffee. The second extractor is run until extraction is completed. The resulting coffee extract (which is now stronger than ordinary coffee beverage) is placed in the third extractor containing fresh grounds and the brewing process is again repeated.

In commercial plant operation, the process is conducted in a semi-continuous manner, the fresh water coming into an extraction battery first reaches the extractor having the most spent, exhausted grounds and proceeds from there to the next most spent grounds and so on until, finally, in the last extractor it reaches the fresh, most recently added grounds. This is known as a counter-current extraction system.

Temperature and pressure in the extractor system will vary greatly. Coffee being produced from fresh grounds is usually processed at low temperature with low pressure. Coffee being produced from spent, exhausted grounds is extracted at high temperature and under high pressure.

In prior art processes, after leaving the extractor system, the coffee extract is clarified of sediment while still at an elevated temperature. One of the most common methods of clarification is by means of a centrifuge in which the coffee liquid is passed through a rapidly rotating cylinder and discharges the clear liquid. Another method is by means of a pressure pump forcing the concentrate through porous paper or cloth.

However, according to one embodiment of this invention, the hot coffee extract is first chilled to near the freezing point so that waxes, tars, and gums which are soluble in the hot extract are precipitated therefrom. The cold extract is then subjected to filtration or centrifugation to free it, not only of the precipitated gums, tars and waxes, but also from any sediment resulting from the extraction process.

Because the initial freezing point of the coffee extract is dependent on the total coffee solids content of the extract, the temperature to which the extra should be chilled to precipitate the gums, tars and waxes varies with the exact nature of the extract. Ordinarily, however, temperatures of 80° F. to 40° F. may be employed in this invention. If it is not desired to form ice in the extract during the precipitation process, the temperature to which the extract is chilled should not be below the initial freezing point. For a coffee extract having 30 wt. percent coffee solids, the temperature is about 27° F.

The coffee extract may be chilled by any convenient means. However, it is preferred to keep the extract under agitation so that the wax and gums formed during the precipitation step do not adhere to the heat transfer surface of the refrigeration means used to precipitate. If desired, the chilled extract may be held at the low temperature for from a few seconds to several or many hours before the waxes, tars and gums are removed, either by centrifugation or filtration. The formation and precipitation of tars, gums and waxes is often time-dependent and complete precipitation may require holding the material at the low temperature employed until the process is complete. Thus, when this invention in a continuous fashion, the time elapsed between the chilling to precipitate waxes and actual separation of the waxes, tars and gums from the chilled coffee extract will depend on the exact nature of the extract.

In some coffee extracts, continued exposure to low temperature will also cause the formation of a non-waxy particulate precipitate. This particulate precipitate forms after the formation of insoluble tars, waxes and gums and does not interfere with the centrifugal separation of ice from concentrated coffee extract after the freeze concentration process. However, such exposure to low temperatures sufficient to cause this particulate precipitate should be avoided because it is tantamount to degradation of the coffee extract. The resulting concentrated product, after this degradation, is not as satisfactory to the consumer as coffee produced from extract which has been chilled only sufficiently to cause the precipitation of tars, gums and waxes.

Depending upon the exact nature of the coffee blend employed in preparing the extract and the extract itself, from less than 0.5 to about 5 percent by weight of tars, gums and waxes will form during the precipitation step. Although most of the gums, waxes and tars which will form from the coffee extract form at near the initial freezing point of the extract, more may form after the extract is subjected to freeze concentration. Thus, the coffee extract may be cooled to below the initial freezing temperature to precipitate the insoluble wax, tar or gum and forming a minor amount of ice in the extract. The extract can then be freed of the waxes and tars by filtration, decantation or centrifugation. The minor portion of ice formed can be removed along with the waxes and tars, or the extract can be slightly warmed to allow the ice to melt prior to removal of the waxes and tars by filtration, decantation or centrifugation.

The tars, waxes or gums produced by the chilling of the coffee extract can be removed as pointed out above. The chilled extract may be held at the chilled temperature until such time as the precipitate settles to the bottom of the container and the precipitate-free portion of the solution can be decanted and then subjected to further procesisng. Alternatively, the chilled extract may be processed in the same manner as hot coffee extract which is to be freed from sediment. Thus, centrifugation, batch or continuous, or pressure filtration techniques; all well known to the art, may be employed to separate the extract from the precipitate.

After being freed from the precipitate, the resulting precipitate-free coffee extract is then subjected to concentration by partial freezing of the water therefrom. This freeze concentration process can be conducted in batch, semi-continuous or continuous apparatus according to methods known to the art and improvements of the methods. However, any method of removing the water from the coffee extract by crystallization as ice is applicable to the process of this invention. The resulting slurry of ice and concentrated coffee extract is then subjected to centrifugation to free the concentrated solution of the ice crystals. The resulting ice crystals are ordinarily washed with water or dilute coffee extract to free the ice crystals completely of residual mother liquor and the washings may be returned to the freeze concentration process. The practice of this invention has the advantage that the centrifuge basket does not become plugged with precipitated tars and waxes and the separation and washing processes are facilitated in their efficiency.

The freeze concentration of the wax, tar and gum free comestible liquid or extract can be accomplished in either a single stage or in a plurality of stages, each of which comprises a crystallizer in which heat is removed from the coffee extract to form a slurry of ice crystals and concentrated mother liquor. After each crystallization stage, ice is removed from the slurry and the concentrated extract either goes to further processing in the preparation of soluble of powdered coffee or is further concentrated in a subsequent stage of the freeze concentration process. The crystallization of ice from the extract is preferably carried out in a tubular heat exchanger, the outside surfaces of which are cooled by a circulating refrigerant. The internal section of the tube is ordinarily fitted with a shaft on which is located agitator paddles. Alternatively, a conventional scraped surface tubular heat exchanger may be employed. Any acceptable separating device or centrifuge may be employed for separating the concentrated coffee extract from the resulting ice crystals. This centrifuge is the preferred method for separating ice from the mother liquor and ordinarily consists of a rotating basket which contains perforations for allowing passage of the mother liquor. The centrifuge may also be equipped with means for washing residual mother liquor from the ice crystals.

Referring now to the drawing accompanying this application, an aqueous comestible extract enters a chilling or cooling apparatus 10 through feed line 11. The chiller may be a conventional refrigeration unit, a continuous tubular heat exchanger or the chilling operation may be conducted in a batch manner by placing containers of extract in a refrigerated room. The chilled extract is then fed to the separator filter 12 through line 13. The separator filter apparatus may be a conventional batch filtration unit or, where the precipitated wax or tar can be handled on a centrifuge basket, may comprise a rotating basket centrifuge or ordinary laboratory or batch-type centrifuge. The separated extract; now free of tars, gums and waxes; is conveyed through line 14 to the tubular crystallizer 15 where the temperature is lowered sufficiently to cause ice to form in the extract. The exact degree of concentration depends upon the cooling medium and temperature on the outside of the crystallizer 15 and the residence time in the crystallizer. Concentrated slurry of ice and mother liquor is then conducted to a centrifuge separating apparatus 16 through the line 17. The centrifuge separating apparatus 16 is preferably a rotating basket centrifuge in which the basket is an open screen material which allows concentrated mother liquor to be removed from the outside periphery of the centrifuge through the line 18 while ice, preferably reslurried in either water or feed extract, is removed via line 19.

As pointed out above, the crystallizing concentration operation may be conducted in a plurality of stages.

What we claim is:

1. An apparatus system for concentration of aqueous liquid coffee or tea extract comprising: precooling and holding means, a precipitate separation device, a first line conducting cooled extract from said precooling and holding means to said separation device, a tubular ice crystallizer, a second line conducting separated extract from said separation device to said tubular ice crystallizer, a centrifuge ice separator, a third line conducting a slurry of ice in a concentrated liquid extract to said centrifuge ice separator from said crystallizer, a fourth line conducting concentrated extract from said centrifuge ice separator, means removing ice from said centrifuge ice separator, and means for washing said ice.

2. An apparatus system according to claim 1 including means agitating said extract in said precooling and holding means.

3. An apparatus system according to claim 1 in which means are provided for washing said ice in said centrifuge.

4. An apparatus system according to claim 1 including means in said tubular ice crystallizer agitating said extract.

5. An apparatus system according to claim 1 in which said ice crystallizer is a scraped surface crystallizer.

References Cited

UNITED STATES PATENTS

| | | | |
|---|---|---|---|
| 1,507,410 | 9/1924 | Zorn | 99—71 |
| 1,636,890 | 7/1927 | Zorn | 99—206 |

ROBERT W. JENKINS, Primary Examiner

U.S. Cl. X.R.

99—71, 77